Aug. 18, 1953     P. G. IPSEN     2,649,315
HIGH-TEMPERATURE EXPANSION JOINT
Filed March 10, 1951
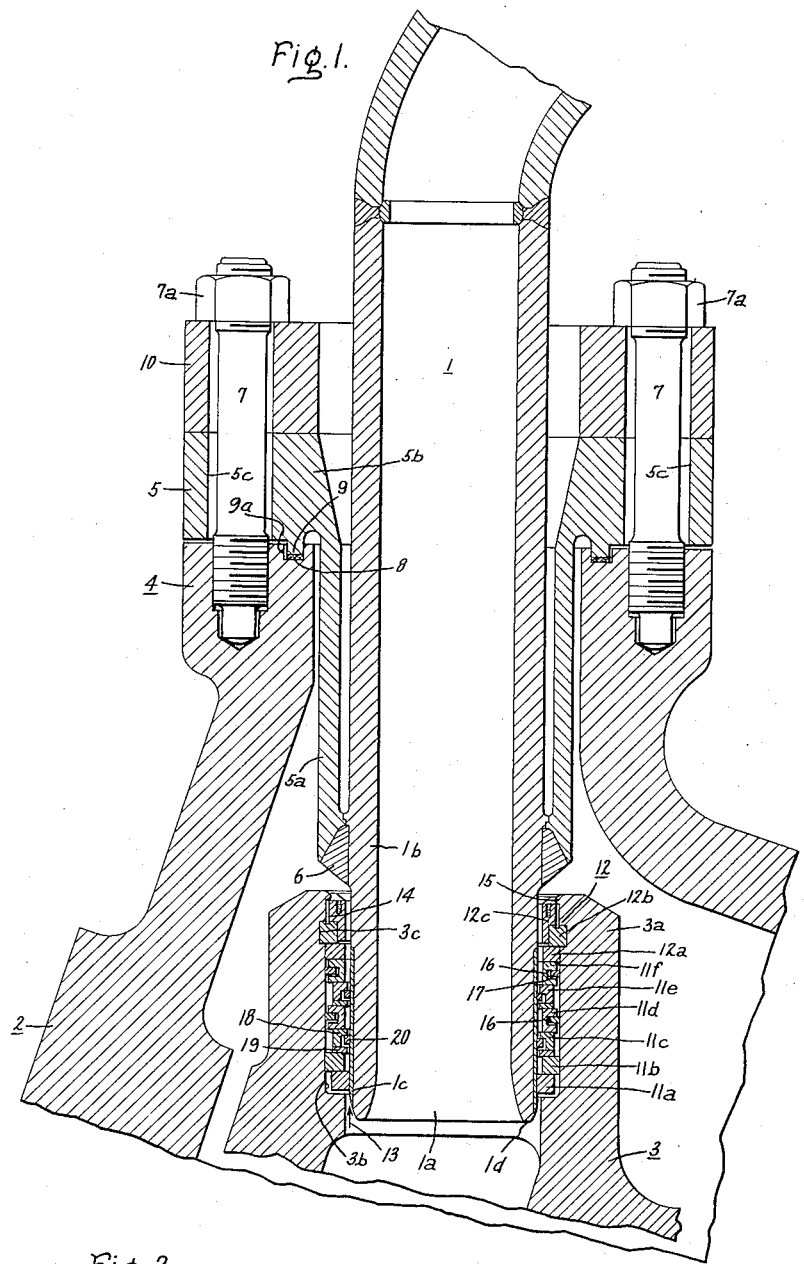
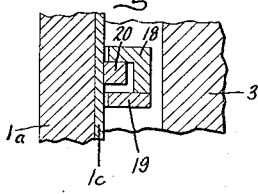
Inventor:
Peter G. Ipsen,
by Ernest H. Britton
His Attorney.

Patented Aug. 18, 1953

2,649,315

UNITED STATES PATENT OFFICE 2,649,315

HIGH-TEMPERATURE EXPANSION JOINT

Peter G. Ipsen, Schenectady, N. Y., assignor to General Electric Company, a corporation of New York Application March 10, 1951, Serial No. 214,938

1 Claim. (Cl. 285—162)

This invention relates to slip-type expansion joints, particularly to a multiple ring-sealed slip joint for connecting a high temperature steam conduit to the casing of a steam turbine or like structure.

In large steam turbines designed for pressures above 1000 pounds per square inch, it has become customary to employ the so-called "double shell" turbine casing arrangement, in which the casing of the high pressure turbine element is surrounded by a heavy spaced outer casing, with an intermediate steam pressure maintained between the two casings. When the operating temperatures are 1050° F. or higher, the inner shell and the steam inlet piping may be made of a stainless alloy such as that known to the trade as "18-8 stainless," containing 18% chromium and 8% nickel. This material is characterized by a coefficient of heat conductivity substantially lower than that of ordinary ferrous alloys; and at the same time it has a substantially higher coefficient of thermal expansion than the more common iron alloys used in turbine construction. The double-shell casing arrangement inherently complicates the matter of connecting the high pressure steam inlet conduit to the high pressure casing of the turbine, and this problem is intensified by the differential thermal expansion characteristics of the conduit and the two shells through which it must penetrate. There have been numerous attempts to provide satisfactory joints for connecting the steam inlet conduit to the high pressure turbine casing incorporating various means for permitting the substantial degree of differential thermal expansion which takes place between the conduit and the inner and outer shells. The majority of such arrangements include some flexible means for securing the inlet conduit to the outer shell, and a slip-type expansion joint sealing the extreme end of the inlet conduit into an opening through the inner shell. The present invention is particularly directed to the problem of providing a suitable seal arrangement for this purpose.

Accordingly, an object of the invention is to provide an improved slip-type expansion joint having a plurality of packing rings interposed between the conduit and casing, and specially arranged to prevent leakage past the rings caused by a characteristic type of deterioration of the rings, due to differential thermal expansion between conduit and casing.

A further object is to provide a slip-type ring-packed joint which will give an improved sealing action while permitting limited relative movement between the conduit and casing in an axial direction as well as transverse shifting of the conduit relative to the casing.

Other objects and advantages will become apparent from the following description, taken in connection with the accompanying drawing, in which Figure 1 represents a sectional view of a portion of a high-temperature, double-shell turbine casing with an inlet conduit connected thereto by a joint incorporating the novel expansion means to which this invention is particularly directed, and Figure 2 is an enlarged detail view of one sealing ring.

Generally, the invention is practiced by interposing a plurality of abutting packing rings between the conduit and casing, certain of the rings being simple solid rings, while others are of a special composite construction adapted to prevent distortion of the rings by the extreme differential thermal expansion which takes place between casing and conduit under conditions of rapidly changing temperature of the motive fluid.

Referring now more particularly to the drawing, the invention is illustrated as applied to a high pressure, high temperature steam inlet conduit indicated generally at 1, connected to a double shell turbine casing, including an outer shell 2 and an inner shell 3.

The conduit 1 passes through an opening in the outer shell 2, which opening is surrounded by a heavy flanged section 4. The inlet conduit is flexibly sealed to the flange 4 by a flanged fitting 5 having an axially extending portion 5a of a relatively thin wall section and secured, as by welding at 6, to an intermediate portion 1b of the inlet conduit 1. The other end of the cylindrical portion 5a is formed integral with a heavy radially extending flanged portion 5b provided with a plurality of circumferentially spaced openings 5c through which pass the securing studs 7. To render this flanged joint fluid tight, a suitable high temperature gasket material is disposed in an annular recess in the casing flange 4, as indicated at 8, and is arranged to be compressed by an annular tongue 9 machined integral with the abutting face of the connecting flange member 5.

Interposed between the coupling flange member 5 and the nuts 7a is a spacer ring member 10. This spacer is employed to distribute the bolt stresses over the flange face and for the following additional reasons.

It will be apparent that the studs 7 are of substantial length, and have a reduced diameter intermediate portion so arranged that any stretching which occurs will take place in this reduced diameter portion without creating excessive stresses in the threaded portions of the studs. As will be appreciated by those skilled in the art, this type of joint is assembled by first heating the studs strongly so as to make them lengthen thermally, tightening the nuts 7a to a predetermined degree, and permitting the studs to cool, with the result that contraction of the studs effects a powerful clamping action between the flange 5b and the casing 4. By using studs of substantial length, the compressive force required to keep the gasket 8 fluid tight can be effectively maintained in spite of the differential thermal expansion which takes place between the studs 7 and the flange 5 due to unequal heating. Furthermore, any inaccuracies in machining the upper surface of spacer ring 10 parallel with the surfaces of flange 5 will result in setting up substantial bending stresses in the stud when the nuts are tightened. A comparatively long stud, as shown, will better withstand such bending stresses. Also, because the flange 5, spacer 10, studs 7 and nut 7a are all of austenitic high temperature alloys with a comparatively high coefficient of thermal expansion, while the outer casing 2 is of ferritic alloy with a smaller coefficient of expansion, there will be a slight decrease in the compressive force exerted by the studs as the steady state temperature is increased. This effect is minimized by the use of the spacer 10 and comparatively long studs.

It may also be noted that, because the outer shell 2 with the flange 4 are made of ferritic materials while the flange 5 is of high temperature austenitic alloy, there will be some differential thermal expansion in a radial direction as temperatures increase. This means that a small clearance space must be provided between the tongue 9 and the recess in the surface of flange 4 in which gasket 8 is disposed. This radial clearance space is illustrated at 9a in Fig. 1. Because of this differential thermal expansion, it is also necessary that the gasket 8 be of the flexible composite steel-asbestos type known to the trade as "Flexitallic."

The multiple ring-packed slip joint to which the present invention particularly relates incorporates a number of rings 11 disposed in an annular recess 3b formed in the inner casing flanged portion 3a, being retained in this recess by a special retainer ring assembly indicated generally at 12. As will be seen from the drawing, the cooperating end portion 1a of the inlet conduit 1 is provided with a coating or inlay 1c of a special material, such as that known to the trade as Haynes "Stellite," which material is carefully selected with reference to the material of the rings, so as to reduce the tendency to stick or "gall," under the influence of high temperatures and pressures.

Referring now more particularly to the structure and arrangement of the sealing rings 11, it is to be noted that the inner end rings 11a, 11b are simple solid integral rings, whereas the succeeding rings 11c, 11d, 11e and 11f are of a special built-up composite construction described below.

As will be apparent from the drawing, the rings 11a, 11c, 11e, have portions sealingly engaging the special insert 1c on the outer surface of the inlet conduit 1; while the alternate rings 11b, 11d, 11f sealingly engage the surface of the cylindrical recess 3b. The rings 11 are all relatively free to slide axially on the outer surface of the conduit 1 and the inner surface of the recess 3b respectively. When steam under pressure is supplied to the inner casing 3, this hot steam acts directly on the end surface of the first ring 11a so that this ring is pushed axially into tight abutting relation with the second ring 11b. The powerful compressive force exerted by the high pressure fluid thus forces all the packing rings 11 into tight axially abutting relation; and the retainer assembly 12 prevents the sealing rings from being blown out of the recess 3b. It is to be particularly noted that the high temperature motive fluid has comparatively free access to the second ring 11b through the radial clearance space formed between the first ring 11a and the casing flange 3a, as indicated by the arrow 13. This means that the first two sealing rings 11a, 11b are strongly and directly heated by the motive fluid so as to rather closely follow any temperature changes thereof. The importance of this will be seen in the method of operation described hereinafter.

Since the second ring 11b fits the recess 3b closely, and since fluid pressure forces the first ring 11a into tight axially abutting relation with the second ring 11b, there is no such access of the hot motive fluid to the third ring 11c and to subsequent rings 11d, 11e, 11f. Furthermore, the transfer of heat by conduction to these subsequent packing rings is comparatively slow, due to the fact that the high temperature stainless alloy of which the inner shell 3 and inlet conduit 1 are made has a comparatively low thermal conductivity, as mentioned above. The net result is that, when the temperature of the motive fluid changes rapidly, the initial rings 11a, 11b change temperature at a rate approximating that of the inner shell 3 and the inlet conduit 1, while the other sealing rings change temperature at an appreciably slower rate.

The packing ring retainer assembly 12 comprises a spacer ring 12a, a segmental abutment ring 12b, and a retaining ring 12c. As will be apparent from the drawing, the spacer ring 12a fits the recess 3b, while the abutment ring 12b is disposed in an annular recess 3c of a somewhat larger diameter than the recess 3b. The abutment ring 12b must of course be made in two or more arcuate segments, having more or less clearance in a circumferential direction between the ends of the abutting segments, in order to permit assembly of these segments one by one in the internal recess 3c. After the segmental ring 12b is installed, the segments are held in place by the integral retaining ring 12c, the only function of which is to prevent the segmental ring 12b from falling out of place. The retaining ring 12c defines an appreciable clearance space with the flange 3a, as indicate at 14, in order to reduce the tendency of the retaining ring to gall and stick to the casing flange 3a. The ring 12c may be held in position by any suitable means, such as a few light tack welds, or by peening the adjacent portion of the flange 3a, as indicated at 15. More specifically, the exterior end surface of the retaining ring 12c may be provided with a plurality of circumferentially spaced notches into which a small portion of the adjacent flange 3a may be peened. Other retaining devices, such as variously arranged locking screws might be used, but peening or tack welding are preferable because of the tendency of threaded members to gall at such high temperatures.

With ring-packed joints of this general type known to the prior art, an important problem has arisen due to the fact that, when plain integral packing rings are used throughout, differential thermal expansion between the inlet conduit and rings produces a permanent "set" in the rings, which promptly results in excessive leakage. This will be more clearly understood from the following. Assume that the machine is cold, and steam at 1000 F. is suddenly admitted through the conduit 1. The conduit, being of comparatively thin wall section, heats very rapidly and expands radially. Because much less directly subjected to the heating effect of the incoming fluid, the packing rings expand more slowly, with the result that the rapidly increasing diameter of the inlet conduit produces an excessive stretching action on the rings. The stress thus generated in the rings has been found to exceed the yield strength of the material, with the result that the packing rings assume a permanent set. Then, when the stretched rings do come up to normal operating temperature, they expand away from the conduit 1 and thus produce a leakage path between the inner circumference of the ring and the outer circumference of the conduit.

This problem is avoided by the use of the composite built-up rings 11c, 11d, 11e, 11f. As noted above, the initial rings 11a, 11b are subjected to direct heating action by the incoming motive fluid, so that they follow the temperature changes of the fluid sufficiently closely to avoid the stretching effect described above. To permit a greater degree of relative expansion, irrespective of the temperature differentials, the remaining rings 11c-11f are of composite construction comprising an annular "box" member or housing ring defining a circumferential recess in which is disposed a split "piston ring." The ring assemblies 11d, 11f have simple integral housing rings, defining in their outer surface a circumferential groove, as shown at 16 in the drawing. In this groove is disposed the piston ring 17, which is of course split at one point in its circumference so it can be expanded and slipped over the housing ring so as to enter the groove 16.

Because it is not so easy to contract a piston ring in order to seat it in an internal groove, the alternate sealing ring assemblies 11, 11e must be of somewhat more complex structure, as shown in Fig. 2. These have a housing or box ring member including a first ring portion 18 of L-shaped cross section and a second cover ring member 19 which cooperates with the first ring 18 to define the internal groove in which the split "piston ring" 20 is disposed.

It will of course be appreciated that the split piston rings 17 are so designed that they have to be contracted slightly in order to enter the recess 3b, in order that they will resiliently expand into contact with the surface of the recess 3b, while the outer circumference of the housing ring defines a radial clearance space with the surface of recess 3b. Similarly, the piston rings 20 are adapted to resiliently contract into close contact with the outer surface of conduit 1, while the inner circumferential surfaces of the composite housing ring 18, 19 form very small clearances with the outer surface of the conduit. As may also be seen in the enlarged view of Fig. 2, the axial width of the split ring 20 is slightly less than the width of the groove, the pressure drop across the ring serving to hold the radial side surface of the ring in sealing engagement with the abutting radial surface of the housing ring.

The reason for the composite split piston ring-housing ring construction will now be seen. If a plurality of ordinary split piston rings were simply assembled in the recess 3b in axially abutting relation, the extremely high axial compressive forces exerted by the motive fluid on the rings would result in such high friction forces between rings that radial expansion and contraction thereof would be hindered or prevented entirely. Also, if a plurality of ordinary split piston rings were assembled in abutting relation, transverse motion between the conduit and casing due to differential thermal expansion in the parts might result in the friction between rings causing the split rings to open up, the resilient tendency of the rings to contract into engagement with the outer surface of the conduit being insufficient to overcome the friction forces tending to spread the ring. The high pressures and temperatures might also cause the piston rings to gall and stick to each other, so that they would become incapable of performing their resilient sealing function. With my arrangement, the housing or "box" rings take the axial compressive forces between the ring assemblies, leaving the split piston rings completely free to expand and contract resiliently to perform their intended sealing function.

The method of assembling the packing rings 11a-11f in the recess 3b and securing them by the retainer assembly 12 will be obvious from the above description of the structure. With these sealing rings in place in the recess 3b, the inlet conduit 1 may be pushed through the multiple sealing rings, which process is facilitated by the tapered and rounded extreme end portion 1d of the conduit.

It will be apparent that it would be possible to use the composite split piston ring and housing ring construction in place of the solid integral rings 11a, 11b. However, for cheapness of manufacture and ease of assembly, it is preferable to make the initial rings 11a, 11b of solid section, especially since they give a better fluid sealing action. This is of course because there will always be some small leakage at the location of the gap in the split rings.

It will be apparent from the above description of the structure that with this arrangement, the inlet conduit 1 may shift transversely relative to the casing flange 4 by reason of the flexibility of the longitudinally extending cylinder 5a. Also, the inner casing flange 3a may shift transversely relative to the end portion 1a of the inlet conduit through sliding between the abutting radial faces of the sealing rings, as permitted by the radial clearances between conduit 1 and the sealing rings 11b, 11d, and 11f, and the similar clearances between the recess 3b and the alternate rings 11a, 11c, and 11e. At the same time, free axial sliding movement is permitted between the end portion 1a of the inlet conduit and the inner shell flange portion 3a. Thus, this expansion joint permits free relative movement between the inlet conduit and the inner shell in all three dimensions. At the same time, the improved packing ring structure insures that the sealing function will not become impaired due to stretching of the rings caused by differential thermal expansion between the conduit and rings.

By way of example, it may be noted that the inlet conduit 1 may be fabricated of the alloy known to the trade as "stabilized 18–8," containing 18% chromium, 8% nickel, and one or two per cent columbium, while the solid rings 11a, 11b, the split piston rings, and the housing rings may be of a high temperature alloy such as that having 19% chromium, 12% nickel, 3% tungsten, and 1% columbium. It is of course important that the solid rings 11a, 11b be made of a material which retains very high yield strength at elevated temperatures so they can take whatever small stretching effect is imposed on them by expansion of the inlet conduit 1, without assuming any permanent set.

It is desirable to surface-harden both the solid and the split piston rings in order to prevent sticking and galling. The split rings must of course be capable of retaining their elasticity and strength at elevated temperatures so they will continue to resiliently engage the outer surface of the conduit and the inner surface of the recess respectively.

While only one modification of the invention has been described specifically, it will be apparent to those skilled in the art that many changes may be made. For instance, as described above, all of the sealing rings may be of the composite ring type incorporating a split piston ring, although the sealing effect may not be quite as good. The number of packing rings used may vary with the fluid pressure. The relative number of solid and composite rings employed may be determined by the magnitude of the temperatures, the rapidity of the temperature changes to be encountered, the materials used, and the rate of heat transfer from the motive fluid to the rings. The total number of rings employed will depend on the room available and the magnitude of the fluid pressure. Other equivalent arrangements may be substituted for the retaining ring assembly 12.

Many other changes will occur to those skilled in the art, and it is desired to cover by the appended claim all such modifications as fall within the true spirit and scope of the invention.

What I claim as new and desire to secure by Letters Patent of the United States is:

In a high-temperature expansion joint for connecting a thin-walled conduit to a comparatively massive casing having a wall defining an opening for receiving the conduit end portion and defining therewith a cylindrical recess, the combination of a first solid integral sealing ring disposed in said recess and exposed to the fluid in said casing and having an inner circumferential surface sealingly engaging the outer surface of the conduit and an outer circumferential surface defining a first radial clearance space with the wall of the recess, a second solid integral sealing ring disposed in said recess adjacent the first ring and exposed to fluid in the casing by way of said first clearance space and having an internal circumferential surface forming a radial clearance space with the outer surface of the conduit and an outer circumferential surface in sealing engagement with the wall of the recess, a third composite sealing ring including an annular housing ring comprising a first portion of L-shaped cross section and a second cover ring portion adapted to cooperate with the L-shaped ring to define an internal circumferential groove and a split packing ring disposed in said groove and having an internal circumferential surface sealingly engaging the outer wall of the conduit, the axial width of the split ring being slightly less than the axial width of the groove whereby the split ring is free to expand and contract resiliently while the pressure drop across the seal ring holds the split ring in sealing engagement with one side wall of the housing ring, a fourth sealing ring disposed in the recess adjacent the third ring and comprising an integral housing ring having an external circumferential groove with a second split ring disposed therein, said second split ring having an outer circumferential surface in sealing engagement with the wall of the recess, the housing ring portions of said third and fourth sealing ring assemblies forming radial clearance spaces with both the outer surface of the conduit and the inner surface of the recess, and retaining means for limiting axial movement of said sealing rings under the influence of fluid pressure within the conduit, whereby the pressure of the fluid maintains the respective abutting side surfaces of sealing rings in fluid-tight relation while compressive forces are transmitted from one composite sealing ring to the next through said housing rings and the split rings are free to expand and contract resiliently, the pressure drop holding the split rings in sealing engagement with one side wall of the housing ring grooves.

PETER G. IPSEN.

References Cited in the file of this patent
FOREIGN PATENTS

| Number | Country | Date |
|--------|---------|------|
| 40,306 | Austria | Dec. 27, 1909 |
| 452,383 | Great Britain | Aug. 21, 1936 |
| 515,549 | Great Britain | Dec. 7, 1939 |